United States Patent
Hodroj

(10) Patent No.: US 10,602,437 B2
(45) Date of Patent: Mar. 24, 2020

(54) INTELLIGENT NETWORK SELECTION

(71) Applicant: T-Mobile USA, Inc., Bellevue, WA (US)

(72) Inventor: Samir Hodroj, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/896,586

(22) Filed: Feb. 14, 2018

(65) Prior Publication Data

US 2019/0253960 A1 Aug. 15, 2019

(51) Int. Cl.
*H04W 4/00* (2018.01)
*H04W 48/18* (2009.01)
*H04W 36/30* (2009.01)
*H04W 36/14* (2009.01)
*H04W 48/16* (2009.01)
*H04W 8/20* (2009.01)
*H04W 72/08* (2009.01)
*H04W 88/06* (2009.01)

(52) U.S. Cl.
CPC .............. *H04W 48/18* (2013.01); *H04W 8/20* (2013.01); *H04W 36/14* (2013.01); *H04W 36/30* (2013.01); *H04W 48/16* (2013.01); *H04W 72/08* (2013.01); *H04W 88/06* (2013.01)

(58) Field of Classification Search
CPC ..................................................... H04W 48/18
See application file for complete search history.

(56) References Cited

U.S. PATENT DOCUMENTS

| | | | | |
|---|---|---|---|---|
| 9,706,423 | B2* | 7/2017 | Horn | H04W 24/10 |
| 2011/0317571 | A1* | 12/2011 | Kokkinen | H04W 24/00 370/252 |
| 2013/0107706 | A1* | 5/2013 | Raleigh | H04L 41/0806 370/230 |
| 2013/0310030 | A1* | 11/2013 | Ventimiglia | H04W 48/16 455/434 |
| 2014/0092731 | A1* | 4/2014 | Gupta | H04W 4/70 370/229 |
| 2015/0056960 | A1* | 2/2015 | Egner | H04W 12/08 455/411 |
| 2016/0095154 | A1* | 3/2016 | Palm | H04W 48/18 370/329 |
| 2018/0167413 | A1* | 6/2018 | Raleigh | H04W 8/18 |

* cited by examiner

*Primary Examiner* — Gerald A Smarth
(74) *Attorney, Agent, or Firm* — Han Santos, PLLC

(57) ABSTRACT

Systems and techniques that allow a mobile device to intelligently steer wireless data traffic among various wireless networks, including cellular networks and/or wireless local area networks (WLAN), is disclosed. The mobile device selects a wireless network to steer the data traffic by following a set of wireless network selection rules or policies. Such rules and policies may include rules for deciding whether to use WLAN, which WLAN hotspots to use, whose WLAN hotspot to use, etc. The policies or rules for steering wireless data traffic may be provided in accordance with Access Network Discovery and Selection Function (ANDSF), which is a framework for specifying and delivering access network selection policies to mobile devices. The network selection is based on (i) account information associated with the mobile device, (ii) network metrics measuring data processing capacity for at least one of the wireless networks, and (iii) location of the mobile device.

18 Claims, 6 Drawing Sheets

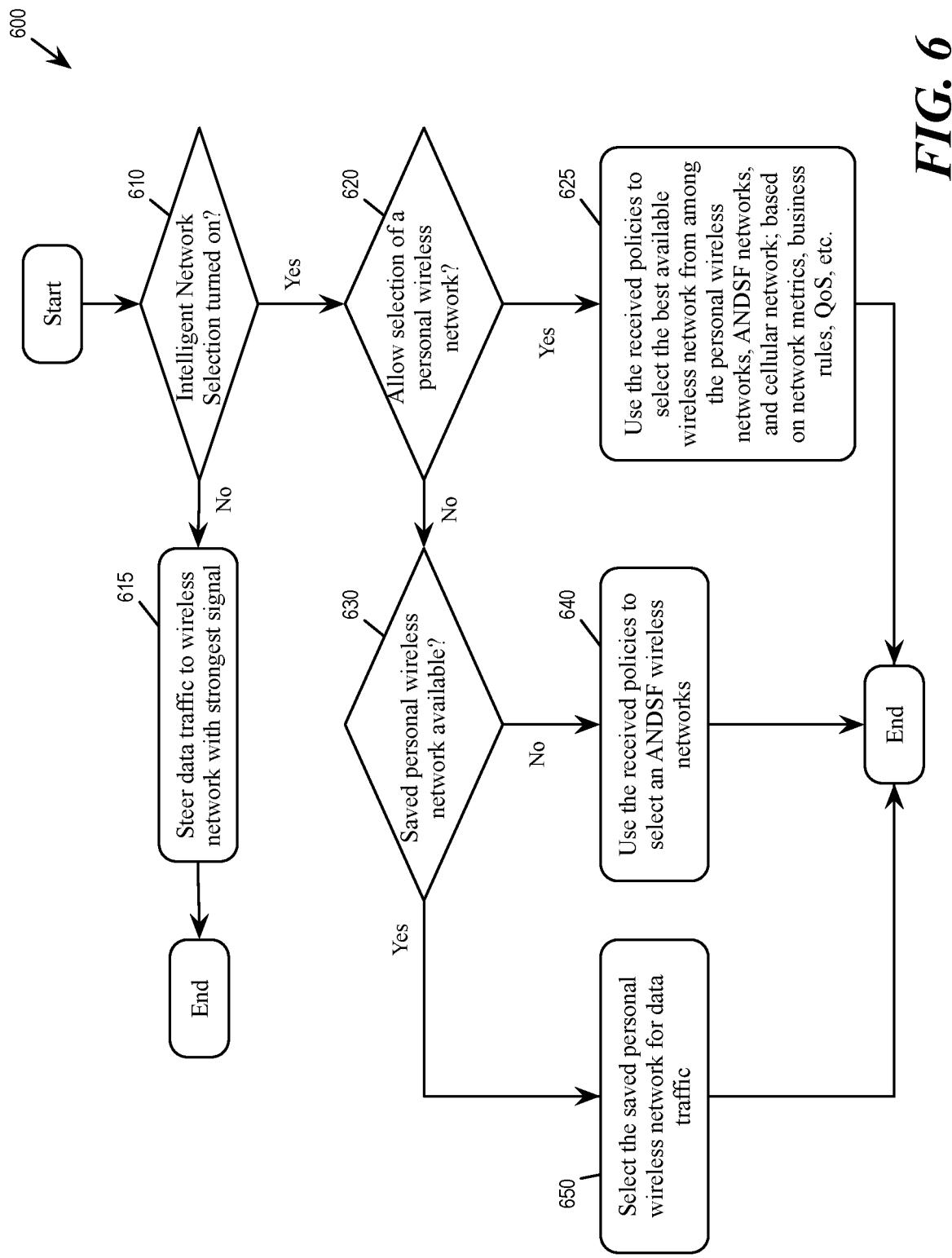

INTELLIGENT NETWORK SELECTION

BACKGROUND

A mobile device typically conduct its data traffic (e.g., with the Internet) through its subscription with a wireless carrier network or mobile network operator (MNO). The same mobile device may also conduct its data traffic through wireless local area networks (WLAN) through WLAN hotspots if such hotspots are available. Depending on its location, the mobile handset may be in the vicinity of zero, one or multiple hotspots of various types. A hotspot can be a personal WLAN hotspot owned by the user of the mobile device, a public WLAN hotspot provided by a venue such as airport, hotel, coffee shops, etc. A WLAN hotspot may also be a WiFi® certified Passpoint™, which enables the mobile device to automatically authenticate to a WLAN without user intervention.

Passpoint™ is an industry solution to streamline network access in hotspots and eliminate the need for users to find and authenticate to WiFi networks. Authentication is performed automatically and silently by the compliant mobile device and hotspot without user actions. This enables a more cellular-like experience when connecting to WiFi networks.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIGS. 5-6 conceptually illustrate processes for performing intelligent network selection.

DETAILED DESCRIPTION

This disclosure is directed to systems and techniques that allow a mobile device to intelligently steer wireless data traffic among various wireless networks, including cellular networks and/or wireless local area networks (WLAN). The mobile device selects a wireless network to steer the data traffic by following a set of wireless network selection rules or policies. Such rules and policies may include rules for deciding whether to use WLAN, which WLAN hotspots to use, whose WLAN hotspot to use, etc. The policies or rules for steering wireless data traffic may be provided in accordance with Access Network Discovery and Selection Function (ANDSF), which is a framework for specifying and delivering access network selection policies to mobile devices.

Figure 1:
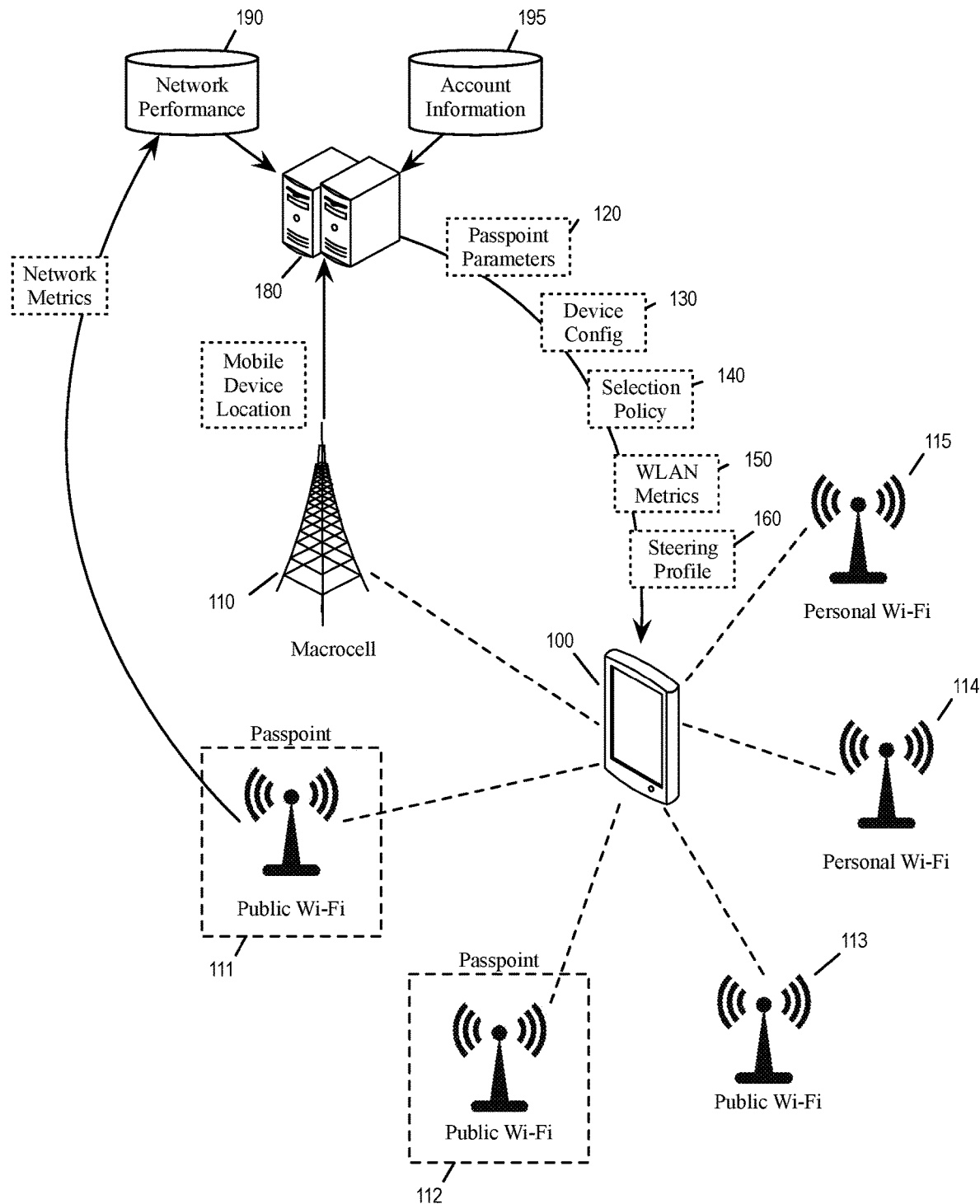
FIG. 1 conceptually illustrates a mobile device that is in the vicinity of multiple hotspots for multiple different wireless networks, consistent with an exemplary embodiment.

FIG. 1 conceptually illustrates a mobile device 100 that is in the vicinity of multiple hotspots for multiple different wireless networks, consistent with an exemplary embodiment. The figure also illustrates the delivery of dynamic information to the mobile device 100 to facilitate the selection of a most suitable wireless network hotspot for data traffic.

The mobile device 100 can be a smart phone, PDA, tablet computer, or any type of computing device capable of communicating wireless data traffic with cellular networks and wireless local area networks (WLANs or WiFi networks). The mobile device 100 may have a user account with a mobile network operator (MNO) or a wireless service provider of another type, allowing the mobile device to use publically accessible wireless networks. The mobile device may also be referred to as a user device or a user equipment (UE).

As illustrated, the mobile device 100 is in the vicinity of several wireless network signal sources 110-115. This means that the mobile device 100 is close enough in distance to these wireless network signal sources to receive signals from them and to transmit signals to them. This also means that, with the correct authentication credentials, the mobile device can access the wireless networks behind these wireless network signal sources. The access points 110-115 are specific to the current location of the mobile device 100. When the mobile device 100 moves to another location with another set of wireless network signal sources, the mobile device would receive information for using those other wireless network signal sources for data traffic.

The wireless network signal sources 110-115 includes signal sources for different types of wireless networks, including macrocells for cellular networks as well as hotspots for WLANs (i.e., WiFi networks). The wireless network signal source 110 is a macrocell of a cellular network that provides radio coverage served by a high power cell site (tower, antenna, or mast). For subscribing mobile devices, the macrocell 110 conducts cellular phone traffic as well as data traffic (including Internet traffic) through its cellular network. For the example illustrated by FIG. 1, the mobile device 100 is a subscribing device with proper credentials to conduct data traffic through the macrocell 110. Though not illustrated, the mobile device may also be within vicinity of microcells or femtocells of a cellular network.

The hotspot 111-115 are WLAN hotspots or access points. Each of these WLAN hotspots provides a wireless local area network for data traffic, which may in turn provide access to the Internet. The hotspots 111-113 are public WLAN hotspots that are usable by visitors or patrons of a venue for data traffic. Some of these public WLAN hotspots are managed hotspots that manage access to their WLANs. A managed hotspot grants access credential by methods that are open to the public, methods such payment, registration, viewing of an advertisement, or proof of a particular membership. The hotspots 114-115 are personal WLAN hotspots. They are owned by private individuals for private use. They grant access by private credentials such as passwords or device MAC addresses that are not open to the public.

Some of the hotspots 111-115 are Passpoint WiFi hotspots. (In the example illustrated in FIG. 1, the hotspots 111 and 112 are Passpoint WiFi hotspots operating Passpoint WLANs). Passpoint is an improved method for connecting to WiFi hotspots from the WiFi Alliance. Authentication is performed automatically and silently by the compliant mobile device and hotspot without user action. Access credential for a Passpoint WiFi hotspot is granted based on the mobile device account or other information that the mobile device already possesses and can be entered automatically by the mobile device without user intervention.

Passpoint WiFi hotspots may also be referred to as ANDSF WiFi hotspots, since they can be selected based on policies provided by ANDSF server.

As illustrated, the mobile device receives at least these types of information: (i) Passpoint parameters 120, (ii) hotspot selection policy 140, (iii) device configuration 130, (iv) WLAN metrics 150, and (v) steering profile 160.

Passpoint parameters include information that a mobile device uses to select and access a Passpoint WLAN. Passpoint parameters 120 include beacon and access network query protocol (ANQP) parameters. These information may include venue name, domain name, network authentication type, roaming consortium list, IP address availability, Internet availability, public land mobile network (PLMN) ID list, cellular network information, channel load conditions, operating class, and operator friendly name. A mobile device capable of accessing Passpoint WiFi hotspots receives synchronous and asynchronous updates of Passpoint parameters 120. Passpoint parameters 120 provides dynamic information that the mobile device can use to find and authenticate to Passpoint WLANs that are available for the mobile device to access. The Passpoint parameters 120 may also include WLAN metrics. Passpoint parameters 120 may generally be referred to as WLAN automatic access parameters. The mobile device 100 uses these parameters to automatically authenticate to a certain class of WLAN hotspots (e.g., Passpoint WiFi hotspots) without user actions.

Hotspot selection policy 130 is delivered to the mobile device, which uses the selection policy to determine how and where to steer data traffic. The policy may determine whether to conduct data traffic through cellular networks or WLANs, or which WLAN hotspots to use, etc. The policies facilitate offloading of data traffic from cellular network to WLANs, or integration of WLAN access with cellular access to achieve the best user experience.

In some embodiments, the selection policy 130 is delivered under the ANDSF framework. The ANDSF framework may be used to deliver information such as WLAN list, location, macro network load, traffic routing, traffic aggregation, as well as any update to the selection policy.

WLAN metrics 150 includes capacity information and performance measures of the WLANs behind the Passpoint WiFi hotspots. These metrics may include link status, upload/download speed, backhaul load, IP address type, and connection capability (such as whether the ports are open or blocked). In some embodiments, the WLAN metrics 150 is delivered to the mobile device along with the Passpoint parameters 120. WLAN metrics may be available for some of the wireless networks (e.g., cellular network, public WLANs, Passpoint WLANs) but not other wireless networks (e.g., the private WLANs and some of the managed WLANs).

Device configuration 130 includes various configuration information delivered to the mobile device 100. The information may include entitlement information allowing the mobile device to access specific cellular networks or WLANs. The entitlement information may include credential for authenticating the mobile device to the cellular networks that the mobile device is a subscriber of, or for authenticating to WLANs that are in the vicinity of the mobile device. In some embodiments, device configuration 130 may be delivered together with the Passpoint parameters 120. In some embodiments, the device configuration may be written in man-machine language (MML) or extensible markup language (XML).

Steering profile 160 includes settings that control how the mobile device 100 uses the selection policy 140 to steer data traffic. Such settings may include control bits that determine whether to perform data traffic steering, whether to use the selection policy 140, whether to steer data traffic to personal hotspots (such as hotpots 114 and 115). The steering profile 160 may further include rules for selecting a wireless network based on the user account information, such as any business rules, quality of service or experience (QoS or QoE) arrangement.

The mobile device 100 receives the Passpoint parameters 120, the hotspot selection policy 140, the device configuration 130, the WLAN metrics 150, and the steering profile 160 from one or more servers 180. The servers 180 may include those operated by (1) the cellular network for which the user of the mobile device 100 is a subscriber; (2) a third-party contractor that operates the servers 180 on behalf of the wireless carrier network; or (3) another cellular network. The servers 180 may provide the information 120, 130, 140, 150, and 160 to the mobile device 100 through any wireless network (cellular networks or WLANs) that the mobile device is connected to.

The servers 180 may include servers that are located at a same or disparate geographic locations. The servers 180 may include servers that are operated by same or different vendors. In some embodiments, different servers provide different types of information to the mobile device 100. For example, the selection policy 140 may come from an ANDSF server, while the device configuration 130 and the steering profile 160 may come from a service entitlement server (SES). The mobile device 100 may also receive the same types of information from different servers. For example, the mobile device may receive two different sets of Passpoint parameters 120 from the ANDSF server and from the SES server.

The servers 180 receives and/or generates several types of data. As illustrated, the servers 180 receives network performance data 190 that are based on network metrics collected from cellular networks and wireless local area networks, including wireless networks behind hotspots 110-115. The servers 180 also collect position information of mobile devices (including the mobile device 100) that subscribes its services. The position information can include GPS information generated by mobile devices, or location of the hotspots that detect the mobile devices. The servers 180 also receive account information 195 (e.g., business information, subscription information, QoS/QoE information) regarding the mobile devices. The servers 180 use these information to generate information 120, 130, 140, 150, and 160.

Example Server Components

Figure 2:
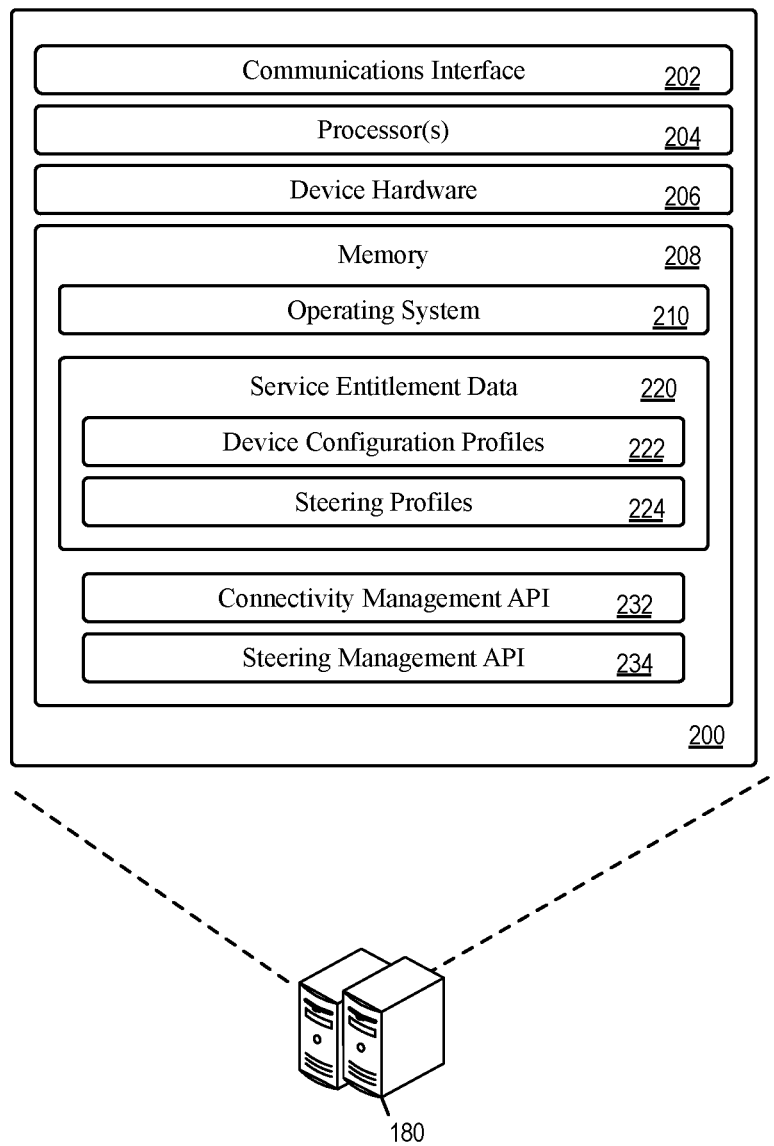
FIG. 2 is a block diagram showing various components of an example SES server, consistent with an embodiment.

FIG. 2 is a block diagram showing various components of an example SES server, consistent with an embodiment of the disclosure. A SES server may provide steering profiles, device configuration, Passpoint parameters and other information to a mobile device or UE.

The figure illustrates a server computing device 200 implementing a SES server. The server computing device 200 is one of the servers 180. The server computing device 200 may be a general purpose computer, such as a desktop computer, tablet computer, laptop computer, server, or other electronic devices that are capable of receiving inputs, processing the inputs, and generating output data. In some embodiments, the computing devices 200 may be virtual computing devices in the form of virtual machines or software containers that are hosted in a cloud.

The computing device 200 may be equipped with a communications interface 202, one or more processors 204, device hardware 206, and memory 208. The communications interface 202 may include wireless and/or wired communication components that enable the computing devices to transmit data to and receive data from other devices, whether through a dedicated wired connection or via a communications network. The device hardware 206 may include additional hardware that performs user interface, data display, data communication, data storage, and/or other server functions.

The memory 208 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 208 of the computing devices 200 may implement an operating system 210, a set of service entitlement data 220, connectivity management application program interface (API) 232 and steering management API 234. The operating system 210 may include components that enable the computing devices 200 to receive and transmit data via various interfaces (e.g., user controls, communications interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The service entitlement data 220 may include device configuration profiles 222 and steering profiles 224 for subscribing mobile devices (including the mobile device 100.) The server computing device 200 uses the connectivity management API 232 to send device configuration data (e.g., 130) to the subscribing mobile devices. The server computing device 200 uses the steering management API 234 to send network selection policies (e.g., 140), Passpoint parameters (e.g., 120), WLAN metrics (e.g., 150), and/or steering profiles (e.g., 160), to subscribing mobile devices.

Example User Device Components

Figure 3:
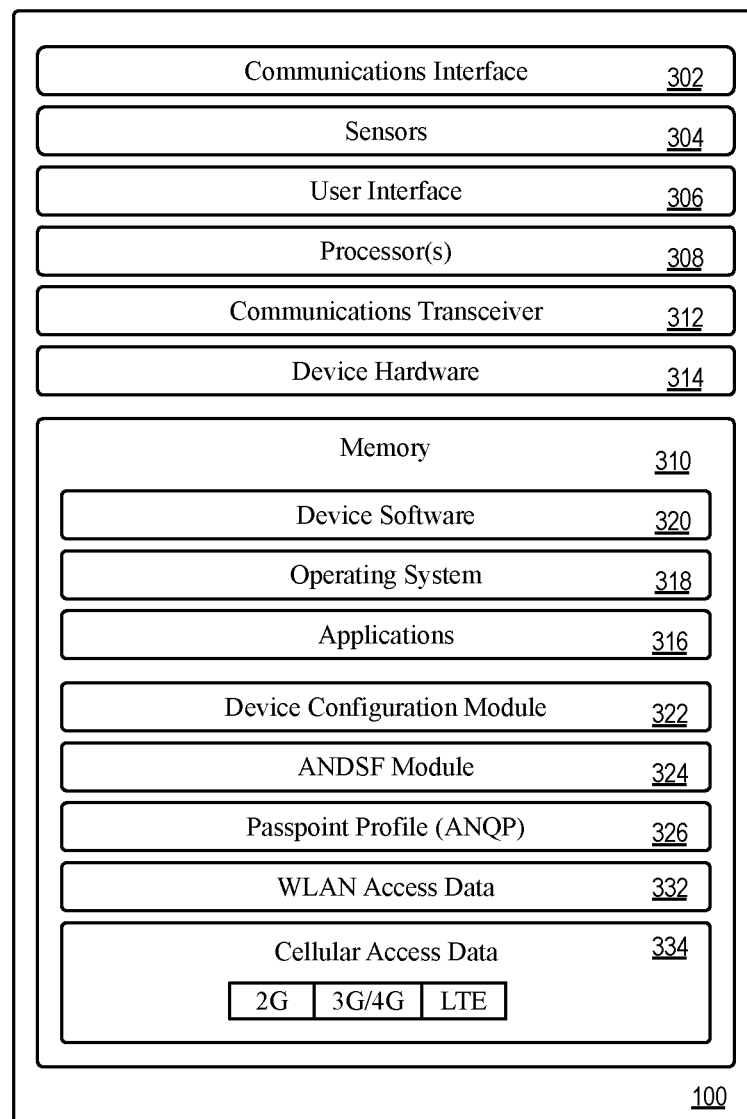
FIG. 3 is a block diagram showing various components of the mobile device, consistent with an embodiment.
Figure 3:
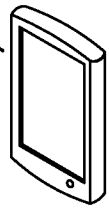

FIG. 3 is a block diagram showing various components of the mobile device 100, consistent with an exemplary embodiment. The mobile device is configured to steer data traffic according to received hotspots selection policies, Passpoint parameters, and other information.

The mobile device 100 (or UE, or user device) may include a communications interface 302, one or more sensors 304, a user interface 306, one or more processors 308, and memory 310. The communications interface 302 may include wireless and/or wired communication components that enable the electronic device to transmit or receive voice or data communication over cellular networks and/or WiFi networks.

The sensors 304 may include a proximity sensor, a compass, an accelerometer, altimeter, cameras, and/or a global positioning system (GPS) sensor. The proximity sensor may detect movement of objects that are proximate the user device 104. The compass, the accelerometer, and the GPS sensor may detect orientation, movement, and geolocation of the user device 100.

The user interface 306 may enable a user to provide inputs and receive outputs from the user device 100. The user interface 306 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 310 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 100 may also include communication transceivers 312 and other device hardware 314. The communication transceivers are hardware components that enable the user device 100 to perform telecommunication and data communication with the multiple communications network, such as wireless networks behind hotspots 111-115. The device hardware 314 may include other hardware that is typically located in a mobile telecommunication device. For example, the device hardware 314 may include signal converters, transceivers, antennas, hardware decoders and encoders, graphic processors, a SIM card slot, and/or the like that enable the user device 100 to execute applications and provide telecommunication and data communication functions. An integrated circuit chip such as a SIM may be inserted into the SIM card slot of the user device 100. Alternatively an embedded SIM that is hardwired into the circuit board of the user device 100.

The one or more processors 308 and the memory 310 of the user device 100 may implement an operating system 318, device software 320, one or more applications 316, a device configuration module 322, an ANDSF module 324. The memory 310 also stores Passpoint profile 326, WiFi access data 332, and cellular access data 334.

The various software and applications may include routines, program instructions, objects, and/or data structures that perform particular tasks or implement particular abstract data types. The operating system 318 may include components that enable the user device 100 to receive and transmit data via various interfaces (e.g., user controls, communications interface 302, and/or memory input/output devices). The operating system 318 may also process data using the one or more processors 308 to generate outputs based on inputs that are received via the user interface 206. For example, the operating system 318 may provide an execution environment for the execution of the applications 316. The operating system 318 may include a presentation component that presents the output (e.g., display the data on an electronic display, store the data in memory, transmit the data to another electronic device, etc.).

The operating system 318 may include an interface layer that enables applications to interface with the communication transceivers 312 and/or the communications interface 302. The interface layer may comprise public APIs, private APIs, or a combination of both public APIs and private APIs. Additionally, the operating system 318 may include other components that perform various other functions generally associated with an operating system.

The device software 320 may include software components that enable the user device to perform functions. For example, the device software 320 may include basic input/output system (BIOS), Boot ROM, or a bootloader that boots up the user device 100 and executes the operating system 318 following power up of the device.

The applications 316 may include applications that provide utility, entertainment, and/or productivity functionalities to a user of the user device 100. The applications 316 may further include electronic mail applications, remote desktop applications, web browser applications, navigation applications, office productivity applications, multimedia streaming applications, and/or so forth.

The device configuration module 322 and the ANDSF module 324 receives data related to data traffic steering from the servers 180. The operating system 318 in turn implements data traffic steering by using the Passpoint profile 326, the WLAN access data 332, and the cellular access data 334 stored in the memory 310.

Figure 4:
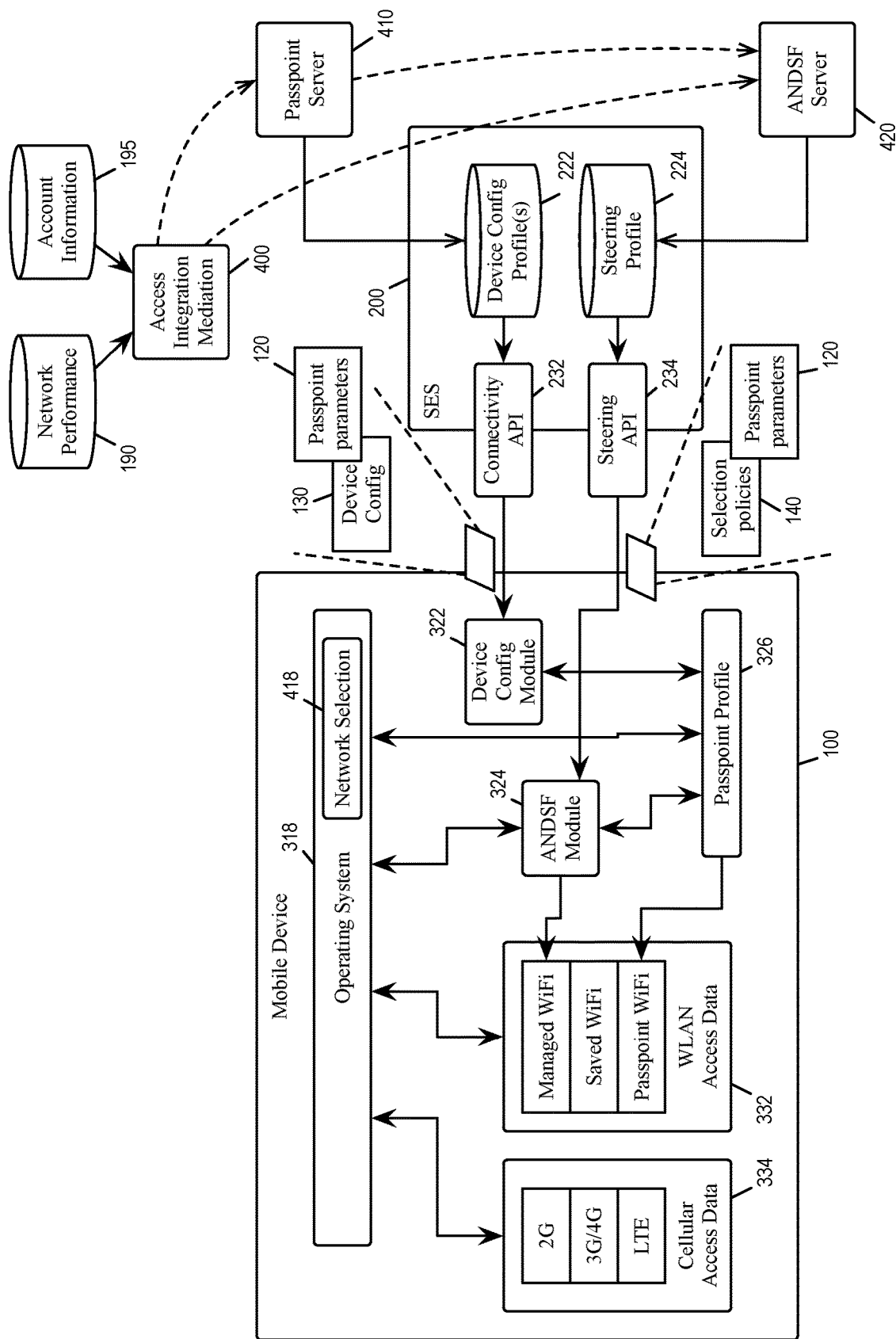
FIG. 4 illustrates flow of data related to data traffic steering between the mobile device and the server computing device.

FIG. 4 illustrates flow of data related to data traffic steering between the mobile device 100 and the server computing device 200. As illustrated, an access integration and mediation server 400 receives the network performance data 190 and the account information 195. The network performance data 190 includes network performance metrics reported by various Passpoint wireless networks. Based on the received data, the access integration and mediation server 400 performs mediation and defines a desired quality of experience or quality of service. A Passpoint server 410 and an ANDSF server 420 receives information generated by the access integration mediation server 400. The Passpoint server 410 generates Passpoint information for accessing Passpoint WLAN service providers. The ANDSF server 420 generates subscription-specific QoE/QoS derived rules and policies.

The SES server 200 generates device configuration data for mobile devices. These information are stored in the device configuration profile 222 at the SES server 222. In some embodiments, the SES maintains device configuration data on a per-device basis and the device configuration update is unique to the mobile device. In some embodiments, the SES maintains device configuration data on a per-device-group basis and the device configuration update is not unique to the mobile device but instead shared by other mobile devices belonging to the same group.

The SES 200 also receives the subscription-specific QoE/QoS derived rules and policies from the ANDSF server 420 and stores the received information as steering profile 224. The SES server 200 may also receive Passpoint information generated by the Passpoint server 410. The received Passpoint information is stored as part of the device configuration profiles 222.

The ANDSF server 420 may receive Passpoint information from the Passpoint server 410 or generate Passpoint information on its own based on information received from the Access Integration Mediation server 400. The SES 200 receives the Passpoint information from the ANDSF server 420 and store the received Passpoint information as part of the steering profile 224.

The SES 200 transmits the corresponding device configuration profile from the device configuration profiles 222 to the mobile device 100 by using the connectivity management API 232. The SES 200 also transmits the corresponding steering profile from the steering profiles 224 to the mobile device 100 by using the steering management API 234. In some embodiments, the SES 200 determines the content of the steering profile 224 and device configuration profile 222 being transmitted based on the geographic position of the mobile device and the account information associated with the mobile device.

The mobile device 100 receives the device configuration profile, which includes device configuration data 130. The received device configuration data 130 is processed by the device configuration module 322. The received device configuration profile may also include the Passpoint parameters 120. The device configuration module 322 passes the Passpoint parameters to the Passpoint profile module 326.

The mobile device 100 also receives the steering profile 224, which include hotspots selection policies 140. The received hotspots selection policies 140 is processed by the ANDSF module 324. The received steering profile 224 may also include the Passpoint parameters 120. The ANDSF module 324 passes the Passpoint parameters to the Passpoint profile module 326.

Both the ANDSF module 324 and the Passpoint profile module 326 also extracts data for accessing WLAN hotspots (passwords, wireless network identifiers, and other types of credentials) from the received steering profile and device configuration profile. The extracted data for accessing WLANs are stored as WLAN access data 332 for accessing different types of WLANs (managed WiFi, saved WiFi, and Passpoint WiFi).

The operating system 318 performs network selection function 418, which uses the ANDSF module 324 and the Passpoint profile 326 to steer data traffic. Specifically, the ANDSF module 324 provides hotspot selection policies to the operating system 318, and the operating system 318 in turn select a wireless network, whether cellular or WLAN, based on the provided hotspot selection policies. For the selected wireless network, the operating system 318 uses the data from the Passpoint profile 326, WLAN access data 332, and/or the Cellular Access Data 334 to generate the necessary access credential for the selected wireless network/hotspot. For example, the WLAN access data 332 may store user name and passwords for accessing personal WiFi of the user's home (saved WiFi). The WLAN access data 332 may also store payment information for managed WiFi of certain venues. The WLAN access data 332 may also store Passpoint parameters for Passpoint hotspots near the mobile device. Cellular Access data 334 may store credential for accessing 2G, 3G, 4G, or LTE networks.

Intelligent Network Selection

In some embodiments, a mobile device in the signal range (or in the vicinity) of multiple wireless networks conducts intelligent network selection when selecting a wireless network for steering data traffic. The network selection is based at least partially on (i) account information (billing information, QoE, QoS agreement, etc.) associated with the mobile device, (ii) network metrics measuring data processing capacity for at least one of the wireless networks, and (iii) location of the mobile device.

Figure 5:
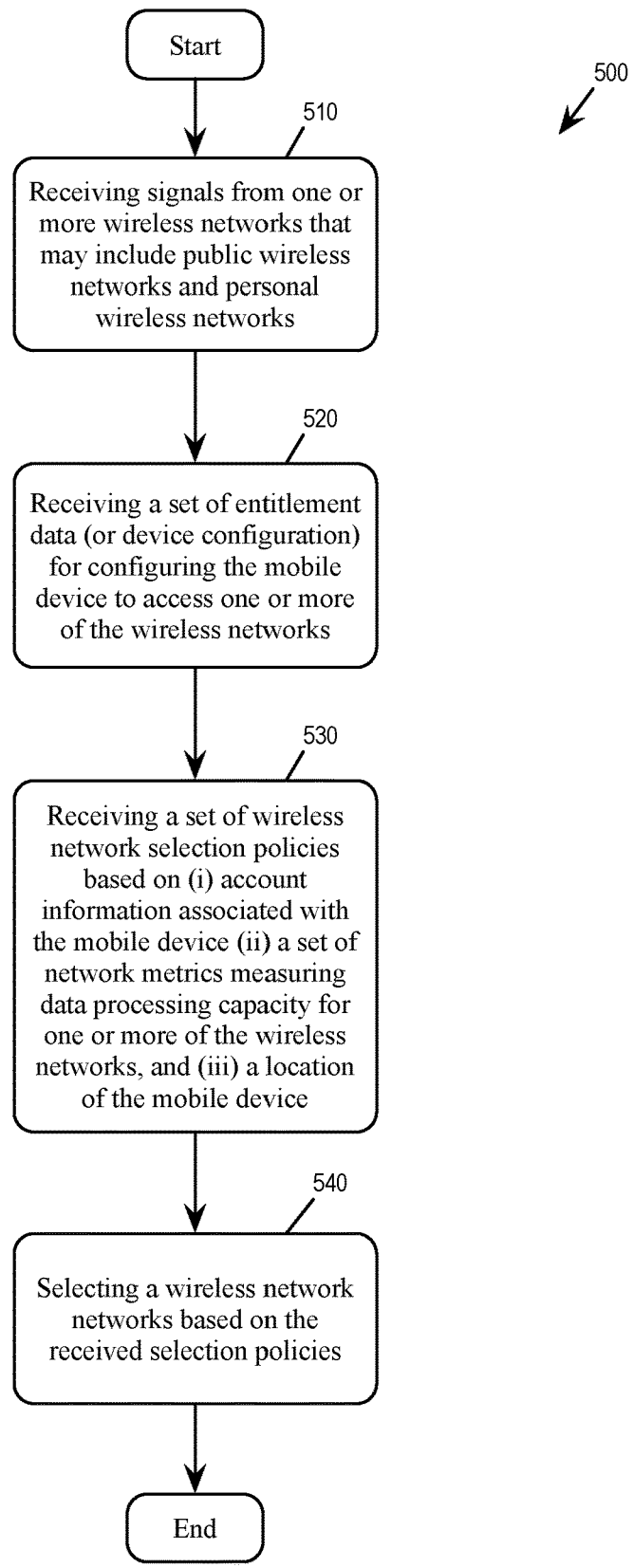

FIGS. 5-6 conceptually illustrates processes 500-600 for performing intelligent network selection. Each of the processes 500-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process. For discussion purposes, the processes 500-600 are described with reference to the mobile device 100 of FIG. 1.

FIG. 5 is a flow diagram of an example process 500 performed by a mobile device when receiving policies and device configuration that are used for network selection.

At block 510, the mobile device receives signals from one or more wireless networks that may include public wireless networks and personal wireless networks. At least some of the wireless networks are Passpoint wireless networks that report status and metrics to the Passpoint server 410 or the access integration and mediation server 400.

At block 520, the mobile device receives a set of entitlement data or device configuration data (e.g., 130) for configuring the mobile device to access one or more of the wireless networks. The device configuration data may include Passpoint parameters for accessing Passpoint WLANs.

At block 530, the mobile device receives a set of wireless network selection policies (e.g., 140). The selection policies are determined based on (i) account information associated with the mobile device, (ii) a set of network metrics measuring data processing capacity for one or more of the wireless networks, and (iii) a location of the mobile device. In some embodiments, the selection policies may include Passpoint parameters for accessing Passpoint WLANs.

At block 540, the mobile device selects a wireless network based on the received selection polices.

At block 550, the mobile device accesses the selected wires network by generating corresponding credential based on the received device configuration data and Passpoint parameters.

FIG. 6 is a flow diagram of an example process 600 for using the received selection policy to select a wireless network. The process implements a selection algorithm that uses the received selection policy to select among personal WLANs, Passpoint WLANs (or ANDSF or policy-based WLANs), or cellular network. In some embodiments, the operating system 318 of the mobile device 100 performs the process 600.

The process 600 starts at 610. At block 610, the mobile device determines whether intelligent network selection function is turned on. The mobile device may allow the user to program this setting via the user interface of the mobile device. The mobile device may also receive this setting from the SES server as part of the steering profile 160. If the mobile device is not configured to perform intelligent network selection, the process proceeds to 615. If the mobile device is configured to perform intelligent network selection, the process proceeds to 620.

At block 615, the mobile device does not perform intelligent network selection. Instead, the mobile device may select a wireless network with the strongest signal without regard to other factors such as network performance metrics or account information. The process 600 then ends.

At block 620, the mobile device determines whether to allow the intelligent network selection function to select a personal wireless network. In some embodiments, the mobile device has setting that allow its user to decide whether intelligent, policy-driven network selection for steering data traffic should be allowed to use personal WLANs. If so, the process proceeds to 625. If the setting does not allow intelligent network selection to use personal WLANs, the process proceeds to 630.

At block 625, the mobile device uses the received policies to select the best available wireless network from among available personal WLANs, public WLANs (including Passpoint/ANDSF WiFi), and cellular networks. The policies allow the mobile device to choose a wireless network based on network performance metrics, business rules (based on account information or billing information), QoS/QoE, etc. For example, the policy may direct the mobile device to choose a Passpoint WLAN with sufficient performance metric to support the QoS of the account of the mobile device as long as no better personal WLAN is available. As another example, the policy may also direct the mobile device to choose a personal WiFi or stay with the cellular network if the billing information of the user account does not permit access to any of the Passpoint WLAN, etc.

At block 630, the mobile device determines whether there is a saved personal WLAN available. At this stage of the process 600, the mobile device is not to allowed to use policy-driven network selection to select a personal WLAN. However, the mobile device may still use a personal WLAN if the mobile device has a saved preference for the personal WLAN (e.g., the personal WiFi of the user's home). The mobile device therefore determines whether there is such a saved WLAN (based on information stored in WLAN Access data 332). If there is a saved WLAN available for access, the process proceeds to 650. If there is no such saved WLAN or if the saved WLAN is not available (e.g., when the mobile device is not at the user's home), the process proceeds to 640.

At block 640, the mobile device uses the received selection policies to select a Passpoint or ANDSF network. This selection can be among the available Passpoint WiFi (according to received Passpoint parameters and detected signals) as well as based on network performance metrics, business rules (based on account information), QoS/QoE, etc. The process 600 then ends.

At block 650, the mobile device selects the saved personal wireless network for data traffic, regardless of content of the received selection policies. The process 600 then ends.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a mobile device storing computer-executable instructions that upon execution cause one or more processors to perform acts comprising:
    receiving a set of wireless network selection policies based on (i) a quality of experience arrangement for an account associated with the mobile device (ii) a set of network metrics measuring data processing capacity for at least one of a plurality of wireless networks, and (iii) a location of the mobile device; and
    selecting a wireless network of the plurality of wireless networks based on the received set of wireless network selection policies;
    wherein the plurality of wireless networks comprises a first set of wireless networks and a second set of wireless networks, wherein the set of metrics measuring data processing capacity is for wireless networks of the first set of wireless networks but not wireless networks of the second set of wireless networks, wherein the first set of wireless networks comprises one or more public wireless local area networks or macro cells, and wherein the second set of wireless networks comprises one or more personal wireless networks.

2. The one or more non-transitory computer-readable media of claim 1, wherein the set of wireless network selection policies is further based on at least one of quality of service, service level agreement, and billing information.

3. The one or more non-transitory computer-readable media of claim 1, wherein the set of wireless network selection policies is received from a server through a cellular network.

4. The one or more non-transitory computer-readable media of claim 1, wherein selecting the wireless network of the plurality of wireless networks comprises determining whether to allow the set of wireless network selection policies to select a personal wireless network.

5. The one or more non-transitory computer-readable media of claim 1, wherein selecting the wireless network of the plurality of wireless networks comprises determining whether the mobile device has saved information for accessing a personal wireless network.

6. The one or more non-transitory computer-readable media of claim 1, wherein the set of metrics comprises at least one of link status, upload/download speed, backhaul load, IP address type, and connection capability.

7. A mobile device comprising:
    one or more processors; and
    a computer-readable medium storing a plurality of computer-executable components that are executable by the one or more processors to perform a plurality of actions, the plurality of actions comprising:
    receiving a set of wireless network selection policies based on (i) a quality of experience arrangement for an account associated with the mobile device (ii) a set of wireless network metrics measuring data processing capacity for at least one of a plurality of wireless networks, and (iii) a location of the mobile device; and
    selecting a wireless network of the plurality of wireless networks based on the received set of wireless network selection policies;
    wherein the plurality of wireless networks comprises a first set of wireless networks and a second set of wireless networks, wherein the set of metrics measuring data processing capacity is for wireless networks of the first set of wireless networks but not wireless networks of the second set of wireless networks, wherein the first set of wireless networks comprises one or more public wireless local area networks or macro cells, and wherein the second set of wireless networks comprises one or more personal wireless networks.

8. The mobile device of claim 7, wherein the set of wireless network selection policies is further based on at least one of quality of service, service level agreement, and billing information.

9. The mobile device of claim 7, wherein the plurality of actions further comprises receiving a set of entitlement data for configuring the mobile device to access at least one wireless network of the plurality of wireless networks.

10. The mobile device of claim 7, wherein selecting the wireless network of the plurality of wireless networks comprises determining whether to allow the set of wireless network selection policies to select a personal wireless network.

11. The mobile device of claim 7, wherein selecting the wireless network of the plurality of wireless networks comprises determining whether the mobile device has saved information for accessing a personal wireless network.

12. The mobile device of claim 7, wherein the set of metrics comprises at least one of link status, upload/download speed, backhaul load, IP address type, and connection capability.

13. A computer-implemented method, comprising:
    receiving a set of wireless network selection policies based on (i) a quality of experience arrangement for an account associated with a mobile device (ii) a set of network metrics measuring data processing capacity for at least one of a plurality of wireless networks, and (iii) a location of the mobile device; and
    selecting a wireless network of the plurality of wireless networks based on the received set of wireless network selection policies;
    wherein the plurality of wireless networks comprises a first set of wireless networks and a second set of wireless networks, wherein the set of metrics measuring data processing capacity is for wireless networks of the first set of wireless networks but not wireless networks of the second set of wireless networks, wherein the first set of wireless networks comprises one or more public wireless local area networks or macro cells, and wherein the second set of wireless networks comprises one or more personal wireless networks.

14. The computer-implemented method of claim 13, wherein the set of wireless network selection policies is further based on at least one of quality of service, service level agreement, and billing information.

15. The computer-implemented method of claim 13, further comprising receiving a set of entitlement data for configuring the mobile device to access at least one wireless network of the plurality of wireless networks.

16. The computer-implemented method of claim 13, wherein selecting the wireless network of the plurality of wireless networks comprises determining whether to allow the set of wireless network selection policies to select a personal wireless network.

17. The computer-implemented method of claim 13 wherein selecting the wireless network of the plurality of wireless networks comprises determining whether the mobile device has saved information for accessing a personal wireless network.

18. The computer-implemented method of claim 13, wherein the set of metrics comprises at least one of link status, upload/download speed, backhaul load, IP address type, and connection capability.

\* \* \* \* \*